A. M. Waterhouse,
Hose Coupling.
No. 13,112. Patented June 19, 1855.
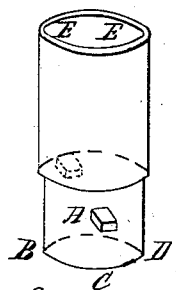
Fig: 1
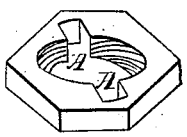
Fig: 2
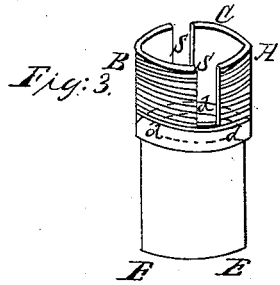
Fig: 3
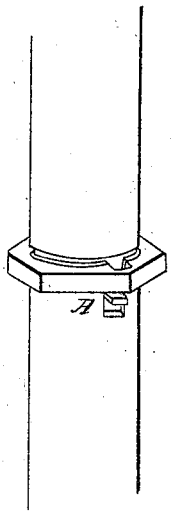
Fig: 4
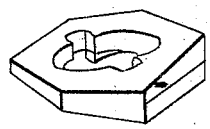
Fig: 5
Witnesses:
Robert G. Pike
James P. B.
Inventor:
A. M. Waterhouse

UNITED STATES PATENT OFFICE.

ALBERT M. WATERHOUSE, OF NEW YORK, N. Y.

HOSE-COUPLING.

Specification of Letters Patent No. 13,112, dated June 19, 1855.

*To all whom it may concern:*

Be it known that I, ALBERT M. WATERHOUSE, of the city, county, and State of New York, have invented and made a new and Improved Coupling for Hose, Water-Pipes, &c.; and I do hereby declare the following to be a full and exact description thereof, reference being had to the accompanying drawings, which constitute a part of this my specification, except Figure 5.

My invention consists of three pieces made of brass or other metal commonly used for hose-couplings and I term it by way of distinction from others, "the independent nut coupling."

The three parts are represented in Figs. 1, 2, and 3. Fig. 1, is a pipe about two and a quarter inches in diameter (the ordinary size for fire hose), the end of which, B, C, D, slides easily into the end B, A, C, of a similar pipe, Fig. 3, entering it an inch or more. On the outer surface of the pipe, Fig. 1, are stout projections or ears A, A, at opposite sides and about an inch from the end B, C, D. These ears A A, fit the slots, S S, in Fig. 3, when the pipes are brought together. Fig. 2 is a slotted nut about an inch thick with a female screw cut on the inner surface which fits a corresponding male screw cut on the outer surface of the end B, A, C of Fig. 3. This nut being screwed on the end B, A, C of Fig. 3 until the slots in the one are made to coincide with the slots in the other, the end B C D, Fig. 1, is pressed through the nut and into the end B, A, C, Fig. 3, the slots in the nut and the pipe being made wide and deep enough for the ears A, A, Fig. 1, to pass easily. When the pipe is thrust in so far that the ears have passed beyond or below the nut, as represented at A, in Fig. 4, the nut is turned around and is carried by its screw down upon the end B, A, C, Fig. 3, and gradually pressing upon the ears brings the end of its pipe B, C, D, Fig. 1, farther into the pipe, Fig. 3, until it is brought home snugly upon the washer "$d, d$" around the interior of the pipe Fig. 3. E E, Figs. 1 and 3, are the opposite ends of the coupling united to the hose in the ordinary way.

I do not confine myself to two ears and corresponding slots: the number may be increased to any extent consistent with economy and strength. But I consider the arrangement pictured in Figs. 1, 2, and 3 to be the best in every respect.

It will be readily seen that this coupling can be made as stout, strong and firm as any in common use, while it has an advantage over others in the fact that it is extremely simple, easily made can be fastened and unfastened rapidly and without disturbing or twisting the hose to which it may be attached, can be made perfectly tight at all times by a simple wrench nor can it be easily loosened as most couplings by lifting or twisting the hose.

I do not claim the pipe as represented in Fig. 1 with two or more projections or ears, but

I claim—

1. The slotted nut with the female screw on its inner surface and I claim the pipe represented in Fig. 3 with straight or vertical slots (one or more) and with a screw on its outer surface.

2. And I also claim the combination of these parts as described or their equivalents each with the other and altogether and all other combinations substantially the same.

ALBERT M. WATERHOUSE.

Witneses:
   ROBERT G. PIKE,
   JAMES PIKE.